Aug. 8, 1950  H. R. LARSEN ET AL  2,517,687
SOLAR ATTACHMENT FOR TRANSITS

Filed March 6, 1947  3 Sheets-Sheet 1

Inventor
Harold R. Larsen
and Joseph C. Thoma
By Dodge & [illegible]
Attorneys

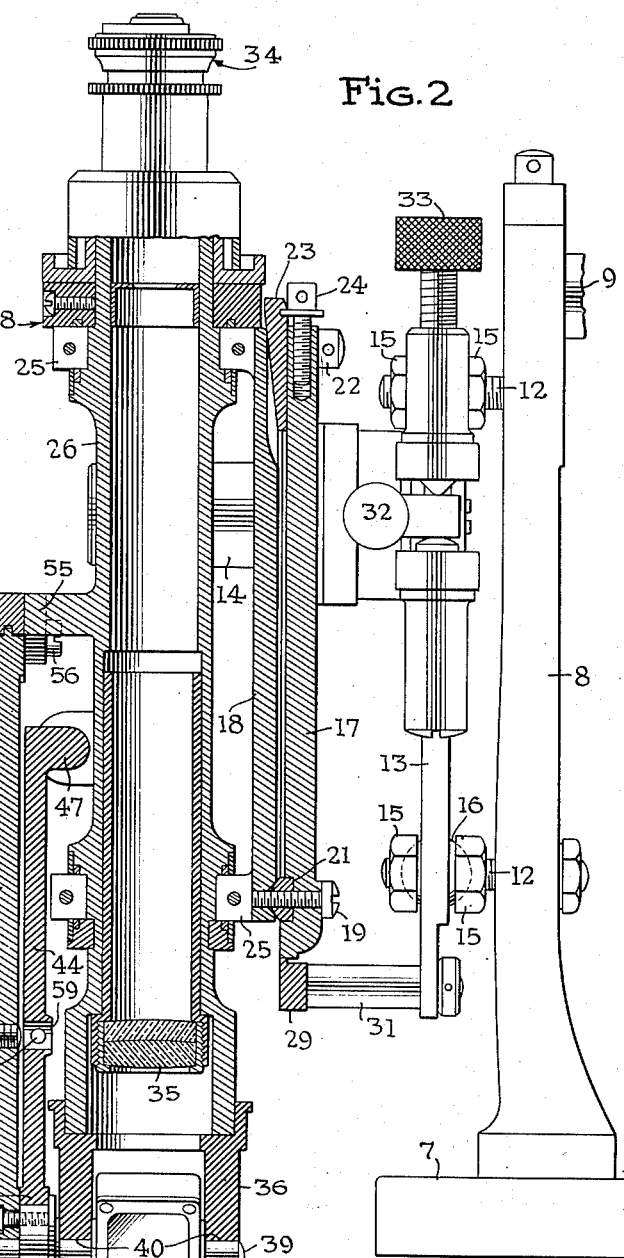

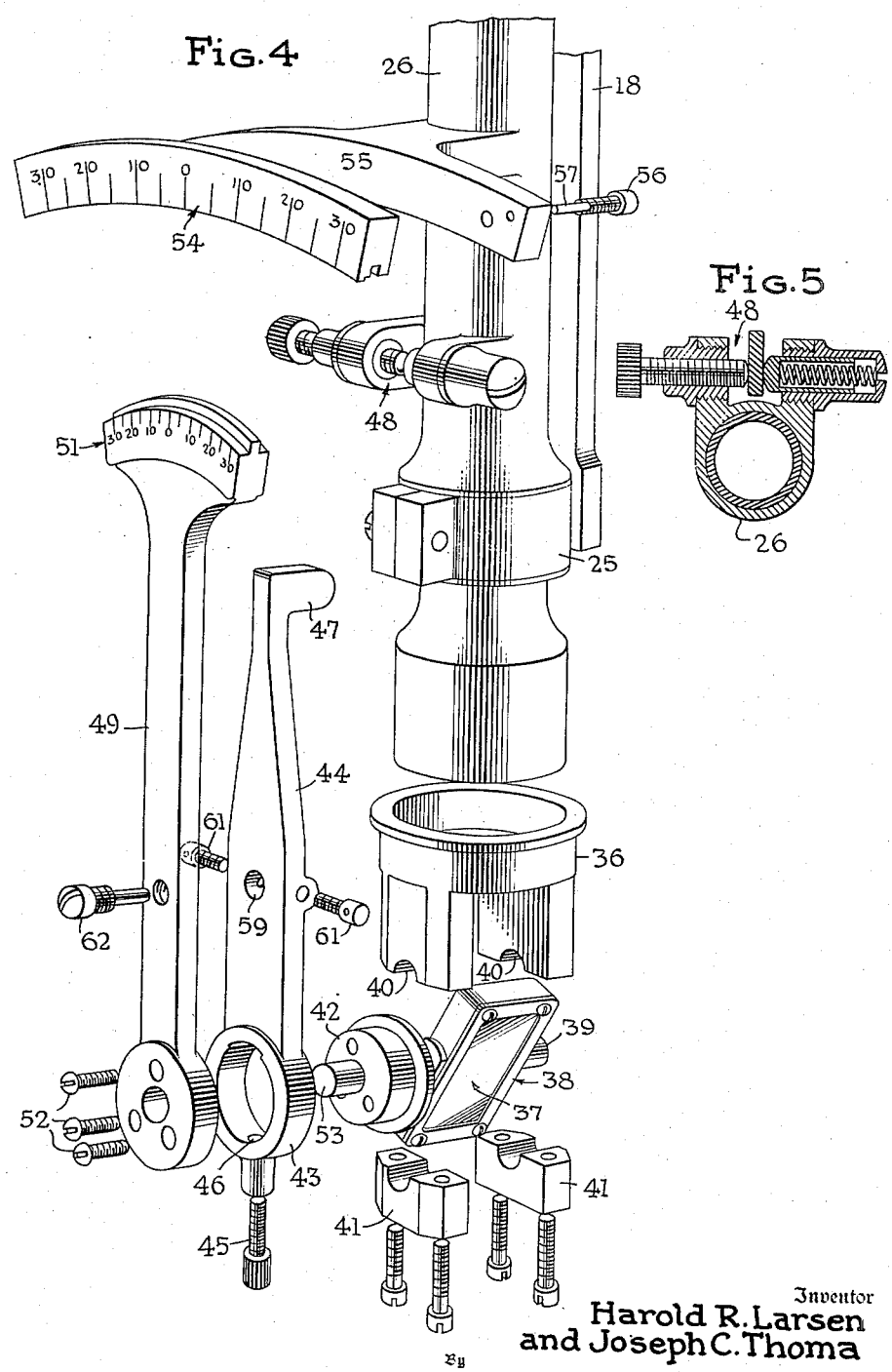

Patented Aug. 8, 1950

2,517,687

UNITED STATES PATENT OFFICE 2,517,687

SOLAR ATTACHMENT FOR TRANSITS

Harold R. Larsen, Troy, N. Y., and Joseph C. Thoma, Washington, D. C., assignors to W. & L. E. Gurley, Troy, N. Y., a corporation of New York Application March 6, 1947, Serial No. 732,868

2 Claims. (Cl. 88—38)

This invention relates to solar attachments for transits, the attachment being of the type commonly known as the Smith Solar attachment in which the solar telescope swings on an axis parallel with the horizontal axis of the transit telescope (latitude adjustment), may be rotated about its own optical axis (hour angle adjustment) and carries, in reflecting relation to its objective, an angularly adjustable reflector which affords the adjustment for declination.

The principal features of novelty reside in the reflector and in the means for adjusting and for measuring the adjustment of the reflector.

Prior art reflectors were of small area and of colored or opaque glass. Hence, only the central part of the objective was used and the resolving power of the telescope was impaired. One reason for using a small reflector was the necessity to turn the reflector edgewise to permit the making of certain observations incidental to checking or adjustment of the instrument. The present invention makes use of a reflector of clear transparent glass whose opposite faces are precisely flat and parallel. The reflector, when set at 45°, is large enough to avail of the entire objective. Thus, it gives an improved image of the sun, and one still bright enough to require the use of the usual darkening glass. Moreover, for the test observations mentioned, the reflector may be set normal to the optical axis of the telescope (or substantially so) and the observer then looks right through it. This greatly facilitates the check observations and adjustments, above mentioned.

The invention has been embodied in commercial transits and this embodiment will be described. To assure an understanding of the invention the basic elements of the attachment will first be described in general terms, after which the improvements for which patent protection is sought will be explained in greater detail.

In the drawings:

Fig. 2 is a section on the line 2—2 of Fig. 1.

Fig. 3 is a fragmentary view, similar to a portion of Fig. 2 and showing the special screw inserted during the zeroing adjustment of the declination arc.

Fig. 4 is an exploded view in perspective of the components of the declination reflector, its arc and vernier and related parts.

Fig. 5 is a section showing how the tangent screw for the declination setting is mounted.

Figure 1:
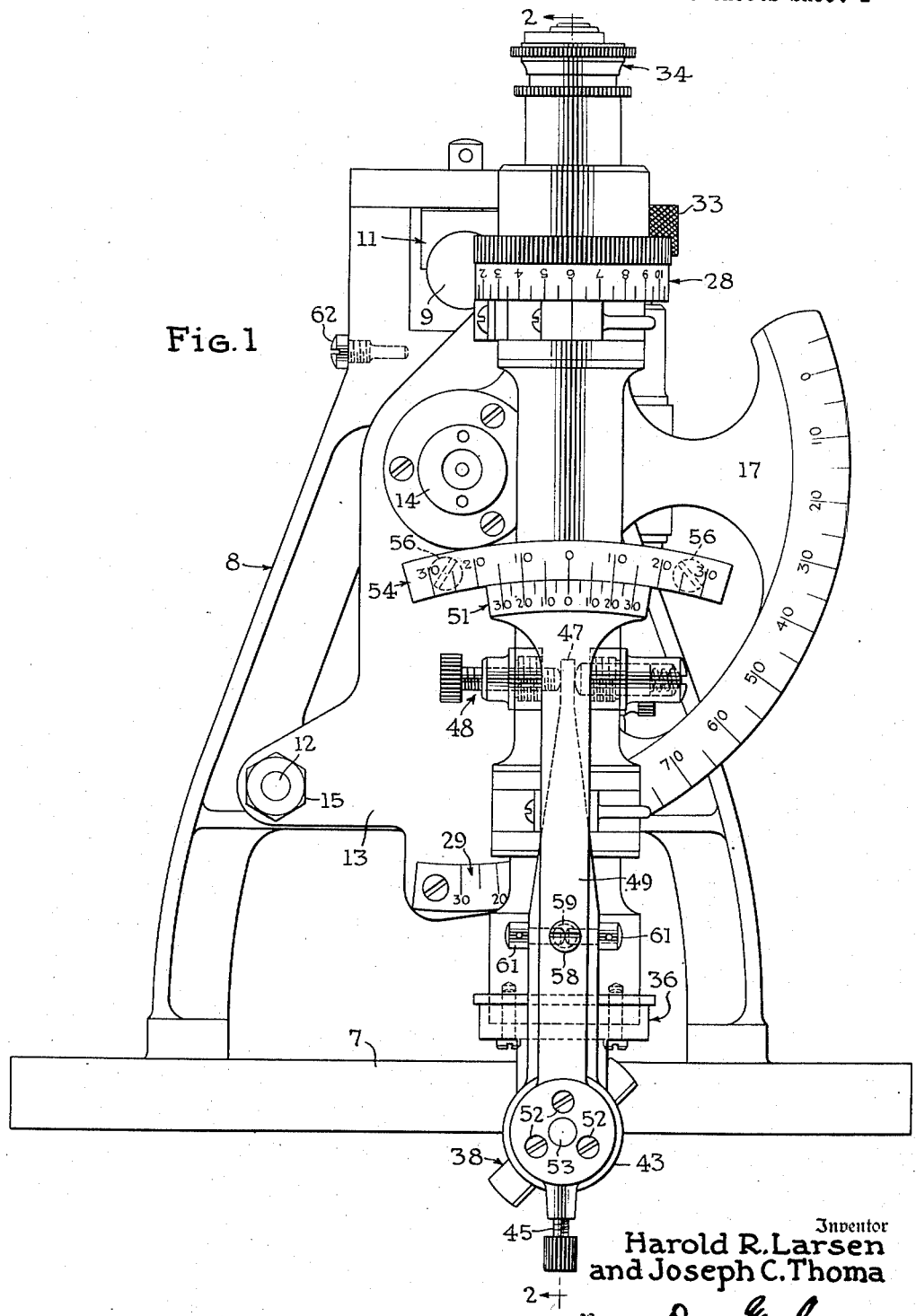
Fig. 1 is an elevation of the complete solar attachment mounted on one standard of a transit.

Refer first to Figs. 1 and 2.

The base or alidade of a transit appears at 7 and carries side frames, one of which appears at 8. The main telescope (not shown) is rotatable in a horizontal axis on trunnions, one of which appears at 9 in Fig. 1. The trunnions turn in bearings such as the bearing 11. This is standard transit construction.

The frame 8 carries three studs 12 arranged with their axes at the three angles of a right triangle. The two 90° sides of this triangle are respectively vertical and horizontal when the transit is leveled. The support plate 13 of the attachment carries a bearing 14 on which the solar telescope swings. The axis of this bearing must be parallel with the axis of the main telescope trunnions 9 so that the optical axes of the solar telescope and of the main telescope will swing in parallel planes. Adjustment of plate 13 to establish this relation is made in a manner known in the art by means of nuts 15 on studs 12. The nuts are, in this instrument, socketed and engage convex sphere-defining washers 16, so that bending stresses which might otherwise distort plate 13 are relieved.

The rotatable member of bearing 14 is attached to the latitude arc 17 on which the wye bar 18 is mounted. To adjust the telescope axis so that it will swing in a plane normal to the axis of bearing 14 the connection at one end is made by machine screw 19 with spherical seating washer 21. At the other end the connection is made by two spaced capstan screws 22, one of which is visible in Fig. 2 (the other being forward of the plane of section). A wedge 23 adjustable by a third capstan screw 24 and extending between capstan screws 22 fixes the position in which screws 22 lock the wye bar.

Ring bearings 25 embrace the barrel of telescope 26 and allow the telescope to be rotated about its optical axis. Its position is indicated by an index which is read against the usual hour circle 28.

The latitude arc 17 is graduated as indicated in Fig. 1 (no attempt being made to illustrate the fine graduations), and coacts with the vernier 29 which is supported in plate 13 by studs 31, one at each end of the vernier. A clamp 32 and tangent screw 33 are provided for latitude settings.

The parts so far described conform to known practice in the art in all important particulars. Certain of the described details of adjustment believed to be novel are not the joint invention of these applicants and so will not be claimed herein. The attachment so far described is simply one environment in which the inventive features, now about to be disclosed, may be used.

Refer now also to Figs. 3 and 4.

The solar telescope is of known form, with eyepiece 34 and objective lens 35. On the end of the telescope barrel 26, beyond the objective lens, is a mount 36 in which the reflector 37 is tiltable on an axis which intersects the optical axis of the telescope at 90°. The reflector 37 is a plate of transparent polished glass whose opposite surfaces are true planes and truly parallel. Since both surfaces reflect, a very high degree of precision is necessary to assure that two relatively displaced images can never be produced.

The reflector plate is mounted in a frame 38 which has trunnions 39 seated in bearings 40. These bearings have removable caps 41 held by cap screws, as shown. One trunnion 39 carries a cylindrical journal 42, coaxial with the trunnion. On this journal the clamp ring 43 of the mirror-adjusting arm 44 swings. Threaded in ring 43 is the clamp screw 45 which reacts on the gib 46 (see Fig. 2) to clamp the arm and reflector together by clamping the arm to the journal. Arm 44 has at its end a lug 47 which coacts with a tangent screw assembly 48 mounted on the telescope barrel.

Attached to the end of journal 42 is the arm 49 which carries the declination arc 51. Attachment is made by three cap screws 52 which are threaded into the end of journal 42 and seat in counterbores in the hub of arm 49. Precise centering is assured by cylindrical lug 53, which is coaxial with trunnions 39 and journal 42. These counterbores and the three holes in the hub are slightly oversize to permit slight angular adjustment of arm 49 relatively to the plane faces of the reflector. Under normal conditions of use, screws 52 are set up tight.

The declination arc 51 is graduated, as indicated, and coacts with a vernier 54 fixed on a yoke 55 formed integrally with the telescope barrel. The vernier is mounted by screws 56 and dowel pins 57 (see Fig. 4).

Under ordinary conditions of use arm 49 is free to swing independently of arm 44 except for the clamping action of clamp screw 45. For adjusting purposes another and temporary connection is afforded.

In the arm is a threaded hole normally filled by a dummy screw 58. Opposite this threaded hole, and in arm 44 is a hole 59. Two opposed capstan screws 61 are threaded into arm 44 so that they are radial with respect to hole 59. Normally they are screwed in until their heads seat. They then perform no function. Screwed into a threaded socket in frame 18 is a special screw 62 having a threaded portion close to its head and an axial extension or stem (see Fig. 3).

When reflector 37 is at 45° to the optical axis of the telescope the declination arc should read zero. If this relation is lost the arm 49 can be readjusted, as follows:

Using tangent screw 48 with clamp screw 45 set, and proceeding by an optical method not here material, mirror 37 is set at precisely 45° to the optical axis of the telescope. The next and final step is to adjust arm 49 relatively to journal 42 so that the arc 51 reads zero.

Screws 52 are loosened enough to free arm 49. Dummy screw 58 is removed and capstan screws 61 are backed clear of hole 59. Special screw 62 is put in place of dummy screw 58, so that its end projects into hole 59 between the ends of capstan screws 61 (see Fig. 3). The capstan screws are then adjusted until the declination arc reads zero. It is then held by the capstan screws in such adjustment. Thereupon the three screws 52 are tightened.

The capstan screws are backed to free screw 62 which is removed and returned to the socket in the standard. The capstan screws are tightened and the dummy screw replaced. This restores the instrument to its ordinary operative condition.

The requirement that the surfaces of the reflector be true planes will be readily understood. The requirement that they be precisely parallel is possibly less obvious. The arriving rays from the sun are parallel and will leave the two reflecting surfaces in parallel paths only if these two surfaces are parallel. Parallel rays entering the objective will be focused and form a single image. Hence, parallelism of the two surfaces is necessary to assure the formation of a single sharp image of the sun.

In compliance with the patent statutes we have described the best embodiment of the invention known to us but the possibility of modifications within the scope of the invention is recognized and no limitation to the specific form here illustrated is implied.

What is claimed is:

1. In a solar attachment for transits, the combination of a solar telescope including an objective lens; a transparent reflector mounted before said lens and having two precisely planar and parallel reflecting faces; and means for tilting said reflector about an axis which intersects the optical axis of the telescope and is at 90° thereto, to assume a series of angular positions in at least one of which the reflecting faces are substantially normal to said optical axis, whereby observations may be made either by reflection in a range of inclined settings corresponding to declination, or alternatively and for adjustment of the telescope, directly through said transparent reflector when the reflecting faces of the reflector are in said substantially normal position.

2. The combination defined in claim 1 in which the reflector is so dimensioned and arranged as to cover substantially the entire field of the objective lens when at an angle of 45° to the optical axis of the telescope.

HAROLD R. LARSEN.
JOSEPH C. THOMA.

REFERENCES CITED

The following references are of record in the file of this patent:

UNITED STATES PATENTS

| Number | Name | Date |
|---|---|---|
| 232,309 | Smith | Sept. 14, 1880 |
| 568,751 | Edwards et al. | Oct. 6, 1896 |
| 1,208,639 | Pidgeon | Dec. 12, 1916 |
| 1,274,935 | Raymond | Aug. 6, 1918 |
| 1,309,486 | Raymond | July 8, 1919 |
| 1,616,660 | Henderson | Feb. 8, 1927 |
| 1,662,565 | Colbert et al. | Mar. 13, 1928 |
| 1,703,705 | Beij | Feb. 26, 1929 |
| 2,242,452 | Cazin | May 20, 1941 |
| 2,253,054 | Tuttle et al. | Aug. 19, 1941 |
| 2,316,466 | Storer | Apr. 13, 1943 |
| 2,394,521 | Lynn | Feb. 5, 1946 |

FOREIGN PATENTS

| Number | Name | Date |
|---|---|---|
| 1,088 | Great Britain | of 1774 |